US012691628B2

(12) United States Patent
Coing

(10) Patent No.: US 12,691,628 B2
(45) Date of Patent: Jul. 28, 2026

(54) MOLD, MOLDING MACHINE AND METHOD FOR MOLDING BY EXTRUSION BLOW MOLDING

(71) Applicant: PLASTIC OMNIUM ADVANCED INNOVATION AND RESEARCH, Brussels (BE)

(72) Inventor: Jean-François Coing, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 19/114,243

(22) PCT Filed: Sep. 29, 2023

(86) PCT No.: PCT/EP2023/077009
§ 371 (c)(1),
(2) Date: Mar. 21, 2025

(87) PCT Pub. No.: WO2024/068902
PCT Pub. Date: Apr. 4, 2024

(65) Prior Publication Data
US 2026/0001268 A1 Jan. 1, 2026

(30) Foreign Application Priority Data
Sep. 30, 2022 (BE) .................................. 2022/5789

(51) Int. Cl.
*B29C 65/02* (2006.01)
*B29C 49/04* (2006.01)
(Continued)

(52) U.S. Cl.
CPC .......... *B29C 49/4812* (2022.05); *B29C 49/04* (2013.01); *B29C 49/18* (2013.01);
(Continued)

(58) Field of Classification Search
CPC . B29C 49/04; B29C 49/18; B29C 2049/2008; B29C 2049/2013;
(Continued)

(56) References Cited

U.S. PATENT DOCUMENTS

2010/0092600 A1 4/2010 Hamaji et al.
2012/0056356 A1 3/2012 Hall et al.
(Continued)

FOREIGN PATENT DOCUMENTS

CA 2 641 463 A1 8/2008
EP 1 211 196 A1 6/2002
(Continued)

OTHER PUBLICATIONS

International Search Report issued on Dec. 8, 2023, in PCT/EP2023/ 077009 filed on Sep. 29, 2023, citing documents 1-4, therein 2 pages.

*Primary Examiner* — Leo B Tentoni
(74) *Attorney, Agent, or Firm* — Oblon, McClelland, Maier & Neustadt, L.L.P.

(57) ABSTRACT

A mold for manufacture by extrusion blow molding includes two parts. At least one of the parts includes at least one first section having a first molding surface including at least one primary contact region to form, by pressing, zones for fixing at least one internal component inside a parison, a second section having a second molding surface, the second section of the part of the mold being movable with respect to the associated at least one first section of the part of the mold, and at least one third section movable with respect to the associated at least one first section of the part of the mold, the at least one third section having a third molding surface including at least one secondary contact region to reduce, by pressing, a predetermined volume inside the parison.

18 Claims, 14 Drawing Sheets

(51) Int. Cl.

| | |
|---|---|
| *B29C 49/18* | (2006.01) |
| *B29C 49/48* | (2006.01) |
| *B29C 65/56* | (2006.01) |
| *B29C 65/70* | (2006.01) |
| B29C 49/20 | (2006.01) |
| B29L 31/00 | (2006.01) |
| B29L 31/30 | (2006.01) |

(52) U.S. Cl.

CPC .. *B29C 49/4815* (2013.01); *B29C 2049/2008* (2013.01); *B29C 2049/2013* (2013.01); *B29C 2049/2095* (2013.01); *B29C 2049/4805* (2013.01); *B29C 2049/4879* (2013.01); *B29L 2031/30* (2013.01); *B29L 2031/7172* (2013.01)

(58) Field of Classification Search

CPC .... B29C 2049/2095; B29C 2049/4805; B29C 49/4815; B29C 2049/4879; B29C 65/02; B29C 65/56; B29C 65/70

USPC ........ 264/515, 516, 529, 540; 425/110, 113, 425/117, 129.1, 522, 532, 535; 156/91, 156/245, 304.1

See application file for complete search history.

(56) References Cited

U.S. PATENT DOCUMENTS

| | | |
|---|---|---|
| 2014/0265052 A1 | 9/2014 | Majima et al. |
| 2015/0014897 A1 | 1/2015 | Yukimaru et al. |
| 2021/0283820 A1 | 9/2021 | Berlin |

FOREIGN PATENT DOCUMENTS

| | | |
|---|---|---|
| WO | WO 2007/090453 A2 | 8/2007 |
| WO | WO 2008/138869 A1 | 11/2008 |

Fig. 27

MOLD, MOLDING MACHINE AND METHOD FOR MOLDING BY EXTRUSION BLOW MOLDING

TECHNICAL FIELD OF THE INVENTION

The present invention relates to a mold for manufacturing by extrusion blow-molding a hollow tank body made of plastic material for a motor vehicle from a parison, the tank comprising at least one internal component fixed inside the parison during the molding of the hollow body. More particularly, the invention relates to a mold comprising two parts comprising a plurality of sections internally defining a mold cavity comprising a total molding surface intended to reproduce a predetermined shape of the hollow body to be manufactured.

The invention also relates to a molding machine for molding by extrusion blow-molding a hollow tank body made of plastic material for a motor vehicle from a parison.

The invention finally relates to a molding method for molding by extrusion blow-molding a hollow tank body made of plastic material for a motor vehicle from a parison, the tank comprising at least one internal component fixed inside the parison during the molding of the hollow body.

TECHNICAL BACKGROUND OF THE INVENTION

In document WO 2008/138869, the Applicant describes a mold for manufacturing a fuel tank provided with an internal component. The mold cavities comprise a plurality of movable rods, a contact surface is provided at the free end of each movable rod to locally push the parison in the molten state and bring it into contact with a region of an internal component to form, by pressing, a fixing of the internal component inside the parison. Another example is described in document US 2014/265052.

Since the contact surface of a movable rod is limited by its cross-section, the more regions to be fixed the internal component has, the more movable rods must be provided. The free end of a movable rod typically has a contact surface of about 4000 mm², which represents less than 2% of the total surface area of the mold. With six movable rods, it is less than 12% of the total surface area of the mold. Likewise, the more internal components are contained in the set of internal components, the more movable rods must be provided. This is not satisfactory because the design of the mold becomes more complex and more expensive to manufacture.

Furthermore, the Applicant has observed that in the location where the parison is pushed by a movable rod toward a region of an internal component, the material of the parison is stretched toward this fixing region so that the parison has a reduced thickness at the fixing. This is not desirable because a reduction in the thickness of the material at the location of the fixing can cause a lack of fixing of the internal component. Furthermore, the reduction in thickness observed at the fixing is often accompanied by another deformation. This other deformation is a rippling of the material around the fixing. This is not desirable since the more deformations the reservoir undergoes during its manufacture, the worse the mechanical resistance of the resulting reservoir will be. The aforementioned risks are obviously aggravated by the proliferation of the movable rods.

The Applicant has also observed that the proliferation of the movable rods leads to a degradation of the cooling temperature of the mold because the movable rods do not form part of the cooling circuit of the mold. This is not satisfactory because a degradation of the cooling temperature homogeneity of the mold is likely to cause deformations of the tank during its manufacture.

Another disadvantage of the above-mentioned mold is that the proliferation of the movable rods leads to the proliferation of the movement mechanisms of the movable rods, which leads to increases the size and complexity of the extrusion blow-molding machine equipped with such a mold.

It is thus understood the cost of manufacturing a tank provided with one (or more) internal component(s) increases with the number of movable rods necessary to fix the internal component(s).

Furthermore, document WO 2008/138869 shows the manufacturing process for a fuel tank of the "saddle tank" type, comprising a depression (also known as the tank "tunnel") designed for the passage of a drive shaft of a motor vehicle equipped with such a tank. When manufacturing this type of tank, the parison is pressed between the two mold cavities in order to reduce a predetermined volume inside the parison to subsequently form the depression of the saddle tank. The predetermined volume inside the parison is reduced during closing of the mold carrying the two mold cavities. In other words, the depression is necessarily formed at the same time as the rest of the saddle tank. This is not satisfactory in terms of flexibility of the manufacturing process, as it is not always desirable to form the vacuum at the same time as the rest of the saddle tank. In fact, in document WO 2008/138869, the internal component is carried by a support which must be retracted before the mold is completely closed to avoid interference between the mold and the support. For example, the manufacturing process disclosed in document WO 2008/138869 does not allow an internal component to be attached which, for example, would only be located in the upper part of the mold, as in this case the mold would have to be closed onto the support, which would lead to the destruction of the mold and/or the support.

SUMMARY OF THE INVENTION

The object of the invention is in particular to remedy the aforementioned disadvantages by providing a mold guaranteeing manufacturing without deformation and at a lower cost of a tank comprising one (or more) internal component(s), independently of the number of attachments of the internal component(s) inside the parison, while offering flexibility of the process for manufacturing the tank.

To this end, the invention relates to a mold for manufacturing by extrusion blow-molding a hollow tank body made of plastic material for a motor vehicle from a parison, the tank comprising at least one internal component fixed to the interior of the parison during the molding of the hollow body, the mold comprising two parts movable relative to one another delimiting internally, when they are closed against each other, a total molding surface intended to reproduce a predetermined shape of the hollow body to be manufactured, at least one of the parts of the mold comprises:

at least one first section having a first molding surface of a first portion of the hollow body to be manufactured, said first molding surface comprises at least one primary contact region configured to form, by pressing, a fixing region for fixing said at least one internal component inside the parison, a second section having a second surface for molding a second portion of the hollow body to be manufactured, said second section of the part of the mold is movable relative to the associated at least one first section of the part of the mold at least between an intermediate closed position and a final closed position of the parts of the mold, and at least one third section having a third molding surface of a third portion of the hollow body to be manufactured, said third molding surface comprises at least one secondary contact region, said at least one third section of the part of the mold is movable relative to the associated at least one first section of the part of the mold at least between an intermediate position and a final position wherein the at least one secondary contact region is configured to reduce, by pressing, a predetermined volume within the parison.

Advantageously according to the invention, the mold makes it possible to fix one or more internal components without resorting to multiple movable rods, those being replaced by the at least one mold section which has a molding surface that is sufficiently extended to be able to press the parison against a plurality of fixing regions for fixing the internal component(s) at the same time.

In addition to the savings in terms of cost, the invention makes it possible to avoid locally deforming the material of the parison during the contacting thereof with a region to be fixed due to the fact that the first molding surface extends between, that is to say in particular comprises, various regions for fixing the internal component(s) with the inside of the parison. By virtue of this arrangement, the thickness of the material at the location of each fixing region is not reduced and the rippling of material around this fixing region is avoided.

Another advantage of the mold according to the invention is that it makes it possible to avoid increasing the size and complexity of the blow-molding machine equipped with such a mold, regardless of the number of fixing regions and the number of internal components of the future tank.

A further advantage of the mold according to the invention is that it enables a predetermined volume inside the parison to be reduced by pressing, using the at least one third section of the mold, independently of the mold closure. In this way, the deformation of the parison during the reduction of the predetermined volume inside the parison is, at the point of reduction, controlled independently of the deformations of the parison undergone at other points of the parison. This is particularly advantageous regarding a mold using extrusion blow-molding to manufacture a hollow body for a "saddle tank" made of plastic material for a motor vehicle from a parison. Owing to the invention, it is not necessary to form the saddle tank depression at the same time as the rest of the saddle tank. In this way, the deformation of the parison produced by the third mold section during the formation of the saddle tank depression is, at the point where the depression is formed, controlled independently of the deformations of the parison undergone at other points of the parison. Furthermore, fixing the at least one internal component before forming the saddle tank depression means that at least one internal component is only located in the upper part of the mold. In fact, by forming the tank depression after the at least one internal component has been fixed and not at the same time, the possibility of interference between the mold and the support for the at least one internal component is eliminated.

The invention may also comprise one or more of the following optional features, taken alone or in combination.

The first molding surface of the part of the mold comprises multiple primary contact regions and is configured so that the primary contact regions simultaneously form, by pressing, multiple regions for fixing said at least one internal component inside the parison. In this way, the first molding surface of the mold part can be used to fix one or more internal components, each internal component having several fixing regions. In addition, the first molding surface of the mold part can be constructed in a modular fashion.

The first molding surface of the mold part may be configured to extend along a circumscribed surface containing the primary contact regions associated with the mold part. Thus, each part comprising a first molding surface has a single surface toward the parison in the intermediate closed position in order to fix the parison, thanks to the various distinct primary contact regions of the first molding surface, according to multiple predetermined fixing regions or all the regions for fixing said at least one internal component of the part of the mold at the same time.

The circumscribed surface of the first molding surface of the part of the mold comprises a predetermined margin distance at least around the contact regions of said at least one internal component associated with the part of the mold in order to limit the ripples of material around each fixing region. It is thus understood that the first molding surface comprises a single surface more extended around the regions for fixing said at least one internal component in order to avoid an excessive relief difference near the regions for fixing said at least one internal component inside the parison. The predetermined margin distance at least around the primary contact regions may be between 1 mm and 60 mm.

The circumscribed surface of the first molding surface of at least one of the parts of the mold is at least equal to 15% of the total molding surface. It is apparent that, according to the embodiment, that is to say if only one part of the mold or the two parts of the mold comprises at least one first section, the total percentage of the at least one first mold section is respectively at least equal to 15% or at least equal to 30% of the total molding surface. Preferably, the circumscribed surface of the first molding surface of at least one of the parts of the mold is between 20% and 40% of the total molding surface. According to the embodiments, the circumscribed area of the first molding surface of at least one of the mold parts is, for example, 20%, 21%, 22%, 23%, 24%, 25%, 26%, 27%, 28%, 29%, 30%, 31%, 32%, 33%, 34%, 35%, 36%, 37%, 38%, 39% or 40% of the total molding surface.

The secondary contact region, or at least one of the secondary contact regions, is configured so as, when the third section of the mold part is in its final position, to bring two opposing regions of the parison into contact so as to locally weld them together. This makes it easy to locally weld two opposite regions of the parison when required, for example to locally reinforce the tank or create a noise barrier. This local weld is sometimes referred to as "kiss off" or "kiss point". Preferably, each mold part comprises at least one third section having at least one secondary contact region, the secondary contact regions being configured, when the respective third sections of each mold part are in their final position, to press between them two opposing regions of the parison so as to locally weld them together.

The third molding surface of the mold part has several secondary contact regions. In this way, the third molding surface of the mold part can be constructed in a modular fashion.

The third molding surface of the part of the mold is configured so that the secondary contact regions simultaneously form, by pressing, multiple regions for fixing at least one internal component inside the parison, at the location of the predetermined volume reduction inside the parison. In this way, the third molding surface of the mold part can be used to fix one or more internal components, each internal component having one or more fixing regions.

The third molding surface of the part of the mold is configured so that the secondary contact regions simultaneously form, by pressing, multiple regions for fixing the parison to itself, inside the parison, at the location of the predetermined volume reduction inside the parison. In this way, the third molding surface of the mold part creates a tank wherein one wall is fixed to an opposite wall.

The at least one third section of the mold part is divided into several subsections separated from each other, and each secondary contact region is carried by a subsection of the at least one third section. In this way, the various secondary contact regions can be made independent of one another.

The subsections of the at least one third section are movable relative to one another between an intermediate position and the final position. In this way, deformation of the parison during the reduction of the predetermined volume inside the parison is better controlled at the point of reduction and parison stretching is limited.

According to a first embodiment, each mold part can comprise at least one first section, a second section and at least one third section. According to a second embodiment, only one of the mold parts comprises at least one first section, a second section and at least one third section. Typically, in the second embodiment, the first part of the mold may comprise at least one first section, a second section and at least one third section, the second part of the mold may comprise a single section made of one piece.

In the final closing position, the at least one first mold section of each part of the mold is preferentially surrounded by its associated second section of the part of the mold. Thus, said at least one internal component is entirely enclosed in the hollow body.

In the final closed position, the at least one third mold section of each part of the mold is preferentially surrounded by its associated at least one first section of the part of the mold. This makes the mold more compact.

In the first embodiment, the at least one first mold section of each part of the mold may comprise at least one primary contact region configured to press the parison against said same at least one internal component in order to form at least two different fixing regions of said same at least one internal component for fixing said same at least one internal component inside the parison during the molding of the hollow body. It is understood that at least one primary contact region of the at least one first section of the first part of the mold can thus be aligned, that is to say, plumb with, at least part of a primary contact region of the at least one first section of the second part of the mold in order to fix two substantially opposite regions of the internal component at the same time in two distinct regions of the interior of the parison. Thus, the first mold sections act as a vice which clamps said at least one internal component.

Regardless of the embodiment, the at least one first and/or third section of the part of the mold may comprise, as in particular in one of the primary and/or secondary contact regions, at least one suction element intended to suction the parison during the molding of the hollow body. Thus, the parison is better pressed on the first and/or third molding surface, which also avoids the local deformation of the parison.

The at least one first and/or third section of the mold part may comprise an element selected from a gripping element, a heating element and a combined gripping and heating element for gripping and/or heating a workpiece, which may or may not be said at least one internal component, intended to be molded with the first and/or third portion of the hollow body. Thus, it is possible to connect a workpiece to the first and/or third portion of the hollow body during its molding. In one example, the gripping element is a gripper or a suction element and the heating element is an electric heater. In one example, the workpiece is a metal fastener or fibrous reinforcement. In another example, the heating element is a hydraulic heater.

The at least one first and/or third section of the part of the mold may comprise a blowing tool intended to introduce a pressurized gas inside the parison. In one example, the blowing tool is a blowing needle. Insofar as a blowing tool is necessary, this arrangement makes it possible to avoid placing a blowing tool in the second mold section, which would have the consequence of degrading the evaporative and mechanical performance of the resulting tank, as well as increasing the risks of deformation experienced by the tank during its manufacture.

The at least one first and/or third section of the part of the mold may comprise a first cooling device intended to cool the first and/or third portion of the hollow body. This makes it possible to avoid any deformation of the first and/or third portion of the hollow body during its manufacture.

The second section of the part of the mold may comprise a second cooling device intended to cool the second portion of the hollow body. This makes it possible to avoid any deformation of the second portion of the hollow body during its manufacture.

Advantageously, the first cooling device and the second cooling device are part of the same cooling circuit. This makes it possible to homogenize the temperature of the mold.

The at least one first and/or third section of the part of the mold may comprise multiple first and/or third sections in order to increase the modularity of the mold.

The invention also relates to a molding machine for molding by extrusion blow-molding a hollow tank body made of plastic material for a motor vehicle from a parison, characterized in that the machine comprises a mold as presented above. Thus, the molding machine benefits from all the advantages associated with the mold.

The invention finally relates to a molding method for molding by extrusion blow-molding a hollow tank body made of plastic material for a motor vehicle from a parison, the tank comprising at least one internal component fixed inside the parison during the molding of the hollow body, characterized in that the method comprises the following steps:

a) introducing said at least one internal component and the molten parison into an open mold in two parts so that said at least one internal component is surrounded by the parison, at least one part of the mold comprising at least one first section, a second section and at least one third section internally delimiting a first molding surface, a second molding surface and a third molding surface, respectively, of a total molding surface of the mold, b) moving the at least one first section of the part of the mold to bring the mold into an intermediate closing position wherein the at least one first section of the part of the mold presses the parison against said at least one internal component in order to fix said at least one internal component inside the parison, the first molding surface being configured to form at the same time, by pressing, multiple regions for fixing said at least one internal component inside the parison, c) moving the second section of the part of the mold relative to the at least one first section of the part of the mold to bring the mold into a final closing position wherein the two parts of the mold are closed against each other and internally delimit the total molding surface intended to reproduce a predetermined shape of the hollow body to be manufactured, d) moving the at least one third section of the part of the mold relative to the at least one first section of the part of the mold to bring the at least one third section into a position wherein the third molding surface presses the parison in order to reduce a predetermined volume within the parison, e) performing a blowing of the parison by pressing said parison on the total molding surface of the mold using a pressurized gas, f) opening the mold to take out the manufactured hollow body.

Steps a) to f) of the molding method according to the invention are preferably carried out successively.

The molding method according to the invention preferably uses an extruded parison. According to the invention, each internal component is surrounded by the parison, either by extruding the parison around each internal component, or by inserting each internal component into the parison. In the case where the internal component is inserted into the parison, the parison can be brought into the open mold by means of a robot.

The extruded parison can be stretched to allow insertion of the internal component without risk of collision with the parison; this may be done by an appropriate device. In one example, the molding method according to the invention uses a tool to stretch the parison to hold it open, such as, for example, of the type referenced 6 in document WO 2008/138869. This tool may consist of clamps, jaws or pincers capable of gripping the edges of the parison and of holding them apart. This tool can be controlled by a robot.

The invention may also comprise one or more of the following optional features, taken alone or in combination.

Preferably, a pressurized gas is introduced inside the parison to pre-blow said parison between step a) and step b). Such an introduction of gas can be carried out according to step b) of document WO 2008/138869 in order in particular to expand the parison by homogenizing the thickness of the parison. The introduction of gas at lower pressure than for step e) can be obtained in different ways known by the person skilled in the art. As a non-limiting example, the introduction of gas for the pre-blowing can be obtained by the blowing tool used to perform step e), by a dedicated tool mounted on the mold, by a hollow shaft for internal component support or by a nozzle comprised in the parison extrusion head.

In step b), said at least one internal component can be fixed inside the parison by welding, heading or mechanical anchoring.

In a preferred embodiment of the method according to the invention, the at least one third section of the part of the mold is divided into multiple subsections which are movable relative to one another between an intermediate position and a final position, and the third molding surface comprises multiple secondary contact regions, each secondary contact region being carried by a subsection of the at least one third section. Owing to this arrangement, each secondary contact region, in an intermediate position, can be brought into contact with the parison to prevent, during a pre-blowing step for example, the parison from swelling and stretching uncontrollably at the point where a reduction, by pressing, of a predetermined volume inside the parison will take place. In addition, each secondary contact region can be brought into the final position to reduce, by pressing, the predetermined volume inside the parison. In this way, deformation and stretching of the parison during the reduction of the predetermined volume inside the parison is better controlled at the point of reduction.

BRIEF DESCRIPTION OF THE DRAWINGS

Other features and advantages of the invention will become apparent from the description given below, by way of indication and in no way limiting, with reference to the accompanying drawings, wherein:

FIGS. 26 and 27 are schematic cross-sectional views of a fifth embodiment of a mold according to the invention in its final position, along a sectional plane passing through a local weld.

DETAILED DESCRIPTION OF AT LEAST ONE EMBODIMENT OF THE INVENTION

Figure 1:
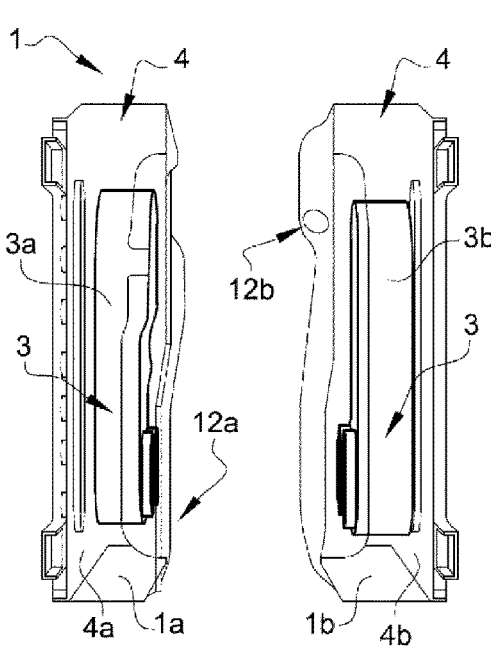
FIG. 1 is a partial side view of a mold according to a first embodiment of the invention in the open position.

In the various figures, identical or similar elements bear the same references, optionally with an index added. The description of their structure and their function is therefore not always repeated.

In the following, the orientations are the orientations of the figures. In particular, the terms "upper", "lower", "left", "right", "above", "below", "forward" and "backward" are generally understood relative to the direction of representation of the figures.

"Tank" is understood to mean a sealed tank able to store a fluid under diverse and varied conditions of use and environments. The tank manufactured with the mold according to the invention is made with a wall formed of plastic material. A tank wall has an inner surface and an outer surface. The inner surface is the surface facing the space inside the tank while the outer surface is the surface facing the space outside the tank.

The term "plastic material" or "plastic" means any material comprising at least one polymer made of synthetic resin. All types of plastics may be suitable. Plastics that are well-suited to the category of thermoplastic materials.

"Thermoplastic material" refers to any thermoplastic polymer, including thermoplastic elastomers, as well as mixtures thereof. The term "polymer" refers to both homopolymers and copolymers (in particular binary or ternary). Examples of such copolymers are, in a non-limiting manner: random copolymers, block copolymers, block copolymers and grafted copolymers.

Any type of thermoplastic polymer or copolymer whose melting point is lower than the decomposition temperature is suitable. Synthetic thermoplastic materials which have a melting range spread over at least 10 degrees Celsius (10° C.) are particularly suitable. Examples of such materials are those which exhibit a polydispersion of their molecular mass.

In particular, it is possible to use polyolefins, thermoplastic polyesters, polyketones, polyamides and copolymers thereof. A mixture of polymers or copolymers may also be used, as well as a mixture of polymeric materials with inorganic, organic and/or natural fillers such as, for example, but not limited to: carbon, salts and other inorganic derivatives, natural or polymeric fibers. It is also possible to use multilayer structures consisting of stacked and integral layers comprising at least one of the aforementioned polymers or copolymers.

A polymer often employed is polyethylene. Excellent results were obtained with high-density polyethylene (HDPE).

In one example, the tank manufactured with the mold according to the invention is a fuel tank that comprises a multilayer structure comprising at least one layer of thermoplastic material and at least one additional layer which can advantageously consist of a liquid and/or gas barrier material. Preferably, the nature and the thickness of the barrier layer are chosen so as to limit as much as possible the permeability of the liquids and of the gases in contact with the wall of the tank. Preferably, this layer is based on a barrier material, that is to say a resin impermeable to a fuel such as EVOH, for example (ethylene copolymer—partially hydrolyzed vinyl acetate). Alternatively, the tank may be subjected to a surface treatment (fluorination or sulfonation), the purpose of which is to make it impermeable to the fuel.

"Parison" is understood to mean a single-piece preform, generally extruded and of a substantially tubular shape, which is intended to constitute the wall of the tank after molding, that is after an operation which consists in placing the parison, which is in the molten state, with the required shapes and dimensions using the mold to obtain a tank.

"Internal component" is understood to mean a component having a function to be fulfilled in the tank such as ventilating, reinforcing, pumping fluid, measuring the level of the fluid, decreasing the noise related to the waves of fluid in the tank. In one example, the internal component is a reinforcement pillar that connects two opposite sides of the inner surface of the tank.

"First section," "second section" and "third section" of the mold are understood to mean respectively a first, second and third molding element located in at least one of the parts of the mold.

"First molding surface" means the inner surface of the at least one first mold section delimiting the molding space of the first portion of the hollow body. This inner surface comprises a bottom and portions protruding from the bottom.

"Second molding surface" means the inner surface of the at least one second mold section delimiting the molding space of the second portion of the hollow body. This inner surface comprises a bottom and portions protruding from the bottom.

"Third molding surface" means the inner surface of the at least one third mold section delimiting the molding space of the third portion of the hollow body. This inner surface comprises a bottom and portions protruding from the bottom.

"The first molding surface is at least equal to 15% of the total molding surface" means that the area of the first molding surface is greater than or equal to 15% of the area of the total molding surface while being strictly less than 100% of the area of the total molding surface.

Advantageously, the sum of the molding surfaces of the two mold parts is equal to the total molding surface. Thus, the two mold parts are sufficient to manufacture the hollow tank body in its entirety.

"Plastic welding" means a set of techniques used to weld two thermoplastic parts. By way of example, plastic welding may consist, insofar as the materials of the internal component and of the parison are compatible with the welding, of applying, by pressing each primary contact region of the at least one first mold section, a contact pressure at the interface between the interior of the parison, which is in the molten state, and a region to be fixed of said at least one internal component. To facilitate the plastic welding, the region to be fixed of said at least one internal component is preferably previously heated to be softened and melted.

"Heading" means a set of techniques used to fix an internal component to the parison, in particular in the case where the materials of the internal component and the parison are not compatible with the welding, by pressing each primary contact region of the at least one first mold section, in order to induce a portion of the parison to enter a recess of the internal component by creeping therein. After the hardening of the parison, the heading prevents the component from coming out of the hardened parison, thanks to the shape of the recess. Examples of a hardened parison form and a component recess are respectively referenced 5 and 3 in FIGS. 1 and 2 of document WO 2007/090453.

"Mechanical anchoring" means a set of techniques used to fix an internal component to the parison, in particular in the case where the materials of the internal component and the parison are not compatible with the welding, by pressing each primary contact region of the at least one first mold section, in order to induce a part of the internal component to enter the parison by creeping therein. After the hardening of the parison, the mechanical anchoring prevents the internal component from coming out of the hardened parison, thanks to the shape of the internal component that entered the parison. Examples of a hardened parison form and an internal component entry part are respectively referenced 116 and 102 in FIG. 10 of document EP 1 211 196.

The extrusion-blow members known to the person skilled in the art are usually reproduced barring some exceptions indicated in the present description. Common members such as the supports for internal components (for example rods), the blowing means, the means for manufacturing the parison, the means for separating and guiding the parison around the internal components or the means for sealing the parison in order to perform pre-blowing, such as those explained for example in the document WO 2008/138869 (see. in particular references 3, 6, 7 and 7') are therefore not always described in the present description.

The following embodiments are examples. Although the description refers to one or more embodiments, this does not necessarily mean that each reference relates to the same embodiment, or that the features apply only to a single embodiment. Simple features of different embodiments can also be combined and/or interchanged to provide other embodiments.

In the present description, it is possible to index certain elements or parameters, for example first element or second element as well as first parameter and second parameter or first criterion and second criterion, etc. In this case, it is a simple indexing for differentiating and naming similar but non-identical elements or parameters or criteria. This indexing does not mean that one element, parameter or criterion has priority relative to another, and such designations can easily be changed without departing from the scope of the present description. This indexing does not imply a temporal order, for example, for assessing such a criterion.

FIGS. 1 to 17 show only the first and second sections. The third section is shown in FIGS. 18 to 25.

Figure 2:
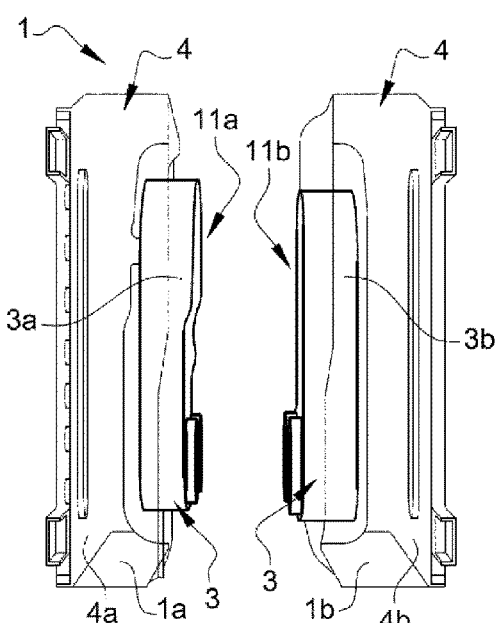
FIG. 2 is a partial side view of a mold according to a first embodiment of the invention in the intermediate closed position.

FIGS. 1 and 2 show a mold 1 for manufacturing by extrusion blow-molding a hollow body 10 of a tank made of plastic for a motor vehicle from a parison 20, the tank comprising at least one internal component 30 fixed inside the parison during the molding of the hollow body. More particularly, FIG. 1 shows the mold 1 in the open position and FIG. 2 shows the mold in an intermediate closed position. As explained below, the hollow body 10 is obtained when the mold 1 is in the final closed position (shown in FIGS. 7 and 10).

The mold 1 comprises two parts 1a and 1b that can be moved relative to each other, internally delimiting, when they are closed against each other (as visible in FIGS. 7 and 10), a total molding surface, or cavity 2, intended to reproduce a predetermined shape of the hollow body 10 to be manufactured.

According to the invention, at least one of the parts 1a, 1b of the mold 1 comprises:
- at least one first section 3a, 3b having a first molding surface 11, 11a, 11b for molding a first portion of the hollow body 10 to be manufactured, said first molding surface 11, 11a, 11b comprising at least one primary contact region 5a configured to form, by pressing, a fixing region for fixing the interior of the parison 20 with said at least one internal component 30,
- a second section 4, 4a, 4b having a second surface 12, 12a, 12b for molding a second portion of the hollow body 10 to be manufactured.

Figure 6:
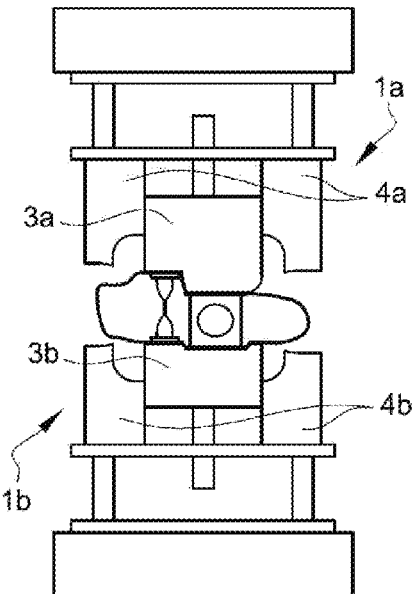
Figure 7:
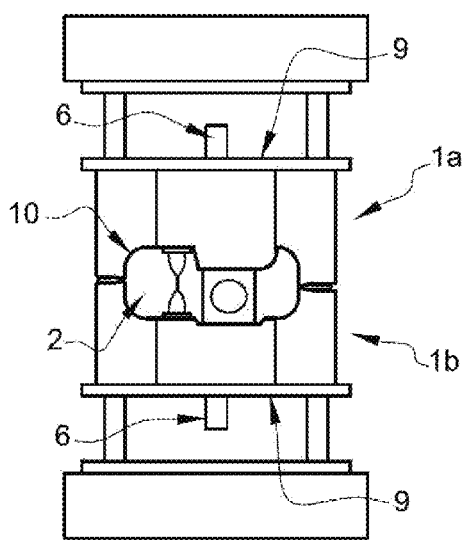
Figure 9:
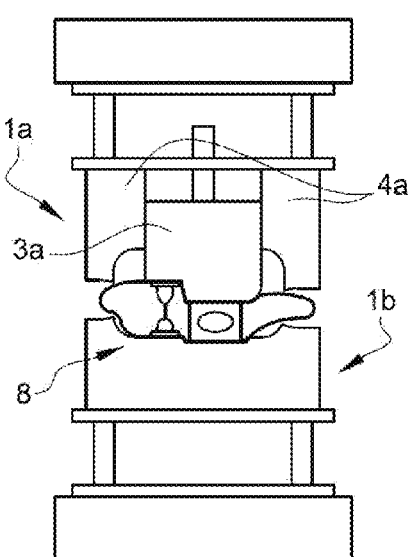
Figure 10:
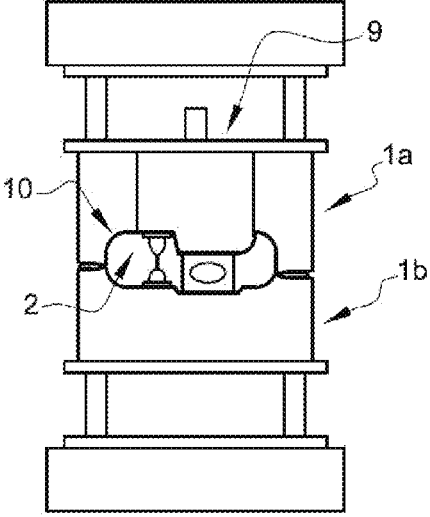

The second section 4, 4a, 4b of the part 1a, 1b of the mold 1 is movable relative to its at least one first section 3, 3a, 3b associated with the part 1a, 1b of the mold 1 between at least one intermediate closing position of the parts 1a, 1b of the mold 1 (shown in FIGS. 2, 6 and 9) and a final closing position of the parts 1a, 1b of the mold 1 (shown in FIGS. 7 and 10).

Figure 3:
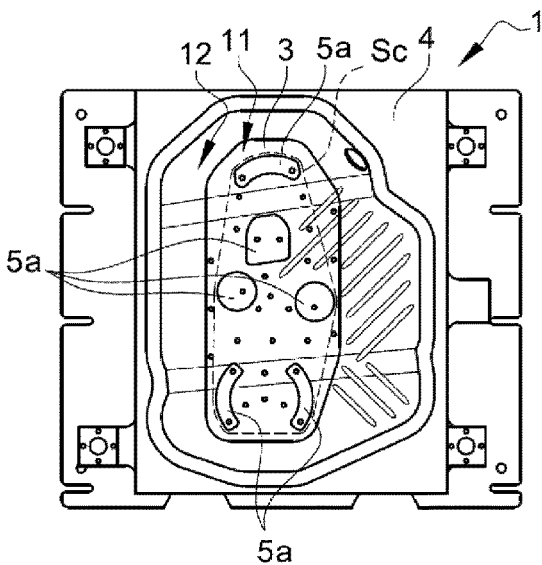
FIG. 3 is a front view of a mold part according to the first embodiment of the invention in the open position.
Figure 4:
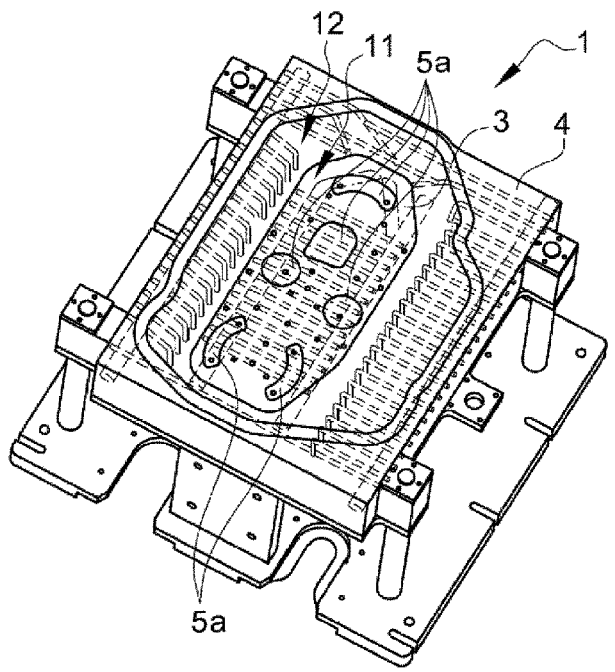
FIG. 4 is a perspective view of a mold part according to the first embodiment of the invention in the open position.

Advantageously according to the invention, the first molding surface 11, 11a, 11b of the part 1a, 1b of the mold 1 comprises multiple primary contact regions 5a as shown in FIGS. 3 and 4 and is configured so that the primary contact regions 5a simultaneously form, by pressing, multiple regions for fixing said at least one internal component 30 inside the parison 20.

As shown in FIG. 3, the first molding surface 11, 11a, 11b of the part 1a, 1b of the mold 1 can thus be configured to extend along a circumscribed surface Sc (in dashed lines in FIG. 3) containing primary contact regions 5a of the part 1a, 1b of the mold 1, or all the primary contact regions 5a associated with the part 1a, 1b of the mold 1. Of course, the circumscribed surface Sc in broken lines in FIG. 3 is only one example and the primary contact regions 5a may not be interconnected by rectilinear segments but curved segments without departing from the scope of the invention.

Thus, each part 1a, 1b comprising a first molding surface 11, 11a, 11b has a single surface toward the parison 20 in the intermediate closed position (shown in FIGS. 2, 6, and 9) in order to fix the parison 20, thanks to the various distinct primary contact regions 5a of the first molding surface 11, 11a, 11b, according to multiple predetermined fixing regions or all the regions for fixing said at least one internal component 30 of the part 1a, 1b of the mold 1 at the same time.

The circumscribed surface Sc of the first molding surface 11, 11a, 11b of the part of the mold may comprise a predetermined margin distance at least around the primary contact regions 5a of said at least one internal component 30 associated with the part of the mold 1 in order to limit the ripples of material around each fixing region. The predetermined margin distance at least around the primary contact regions 5a may be between 1 mm and 60 mm. Of course, the predetermined margin distance is not necessarily constant relative to each primary contact region 5a or between each primary contact region. FIG. 3 thus shows an example of a first molding surface 11 whose predetermined margin is not constant around another example of a circumscribed surface Sc in dashed lines without the invention being limited thereto.

The circumscribed surface Sc of the first molding surface 11, 11a, 11b of at least one of the parts 1a, 1b of the mold 1 is preferentially at least equal to 15% of the total molding surface. It is apparent that, according to the embodiment, that is to say if only one part 1a, 1b of the mold 1 or both parts 1a, 1b of the mold 1 comprises at least one first section 3, 3a, 3b, the total percentage of the at least one first mold 1 section 3, 3a, 3b is respectively at least equal to 15% or at least equal to 30% of the total molding surface. Preferably, the circumscribed surface Sc of the first molding surface 11, 11a, 11b of the mold part 1a, 1b is between 20% and 40% of the total molding surface, that is, for example equal to 20%, 21%, 22%, 23%, 24%, 25%, 26%, 27%, 28%, 29%, 30%, 31%, 32%, 33%, 34%, 35%, 36%, 37%, 38%, 39% or 40%.

Figure 5:
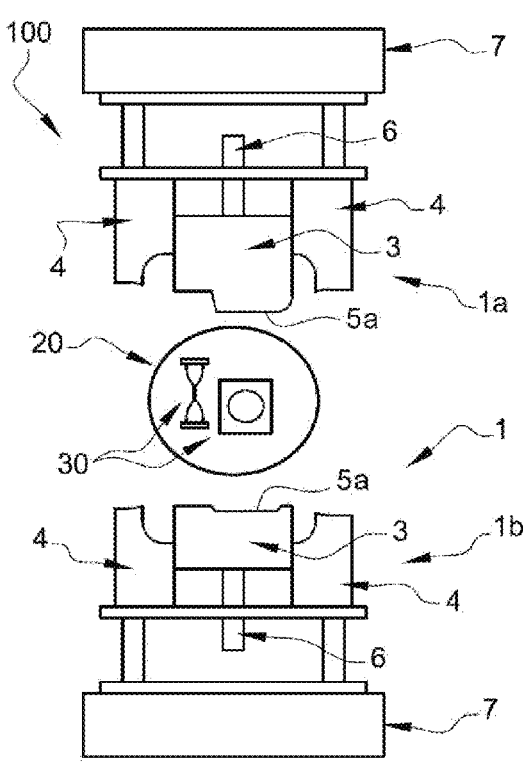
FIGS. 5 to 7 are schematic sectional views of the first embodiment of a mold according to the invention in different successive positions.

FIGS. 5 to 7 show a molding machine 100 for molding by blow-molding a hollow body 10 of a plastic material for a motor vehicle from a parison 20. The machine 100 comprises the mold 1 presented above according to a first embodiment. FIG. 5 shows the mold 1 in the open position (open mold 1), FIG. 6 shows the mold 1 in the intermediate closed position and FIG. 7 shows the mold in the final closed position.

In the intermediate closing position, the at least one first section 3, 3a, 3b of mold 1 protrudes from the second mold section 4, 4a, 4b of mold 1. In the final closed position, the second section 4, 4a, 4b of the mold 1 surrounds the at least one first section 3, 3a, 3b of the mold 1 which has not changed position.

The at least one first section 3, 3a, 3b of the mold 1 comprises primary contact regions 5a configured to press the parison 20 against said at least one internal component 30 in order to form at least two different regions for fixing said same at least one internal component 30 in order to fix said same at least one internal component 30 inside the parison 20 during the molding of the hollow body 10.

Advantageously, each primary contact region 5a is configured to allow the welding, the heading or the mechanical anchoring to fix said at least one internal component 30 inside the parison 20 during the molding of the hollow body 10. Each primary contact region can thus comprise a geometry, mechanical characteristics and/or a material intended to facilitate welding, heading or mechanical anchoring. By way of non-limiting example, the primary contact region 5a may comprise a flat surface, the material of which has a melting point greater than that of the parison and the region to be fixed of the internal component so that, by pressing the primary contact region, at least one welding fixing region is formed between the parison and the region to be fixed of the internal component. Of course, in addition or in substitution, the primary contact region may also comprise a protrusion intended to promote a crimping and/or a recess intended to promote mechanical anchoring.

The first mold 1a part 1 comprises at least one first section 3a of mold 1 and, the second mold part 1b of mold 1 comprises at least another first section 3b of mold 1. The at least one first section 3a of mold 1 is movable relative to the at least one other first section 3b of mold 1 between the open position and the intermediate closed position of the mold 1. The at least one first section 3a, 3b of each mold 1 part 1a, 1b comprises a first actuator 6 for going from the open position to the intermediate closing position and vice versa.

The first mold 1 part 1a comprises at least one second section 4a of mold 1 and, the second mold 1 part 1b comprises at least another first mold 1 section 4b. The second mold sections 4a, 4b of mold 1 are movable relative to each other between the intermediate closure position and the final closed position of the mold 1. Each second mold section 4a, 4b of mold 1 comprises a second actuator 7 for going from the intermediate closed position to the final closed position and vice versa.

Figure 11:
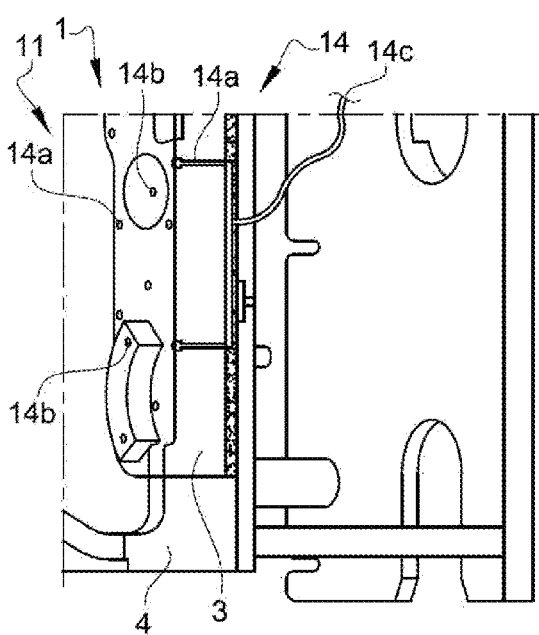
FIG. 11 is a cross-sectional view of a mold part according to the invention showing suction elements.

In the example shown in FIG. 11, the at least one first mold section 3 comprises, in at least one primary contact region 5a, at least one suction element 14b intended to suction the parison 20 during the molding of the hollow body 10. It can also be seen that the bottom of the first molding surface 11 also comprises at least one suction element 14a. It can also be seen that a plurality of suction elements 14a are interconnected and communicate via a connection 14c with a suction device (not shown) such as a vacuum machine. Thus, the parison 20 is better pressed on the first molding surface 11, which also avoids the local deformation of the parison 20.

Figure 13:
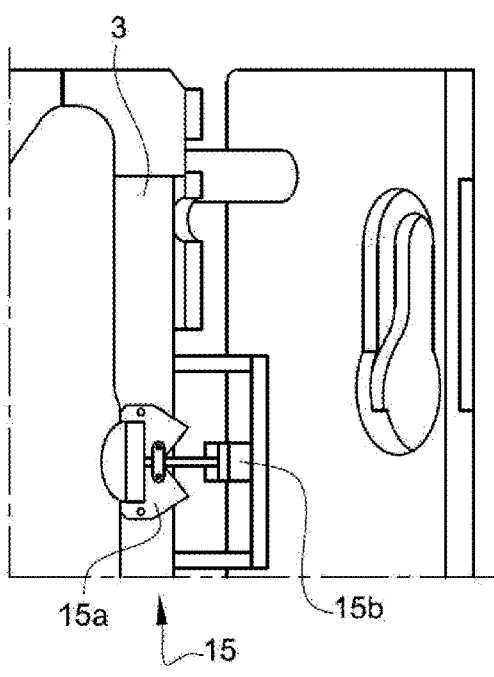
FIG. 13 is a cross-sectional view of a mold part according to the invention showing a gripping element in the non-activated state.
Figure 14:
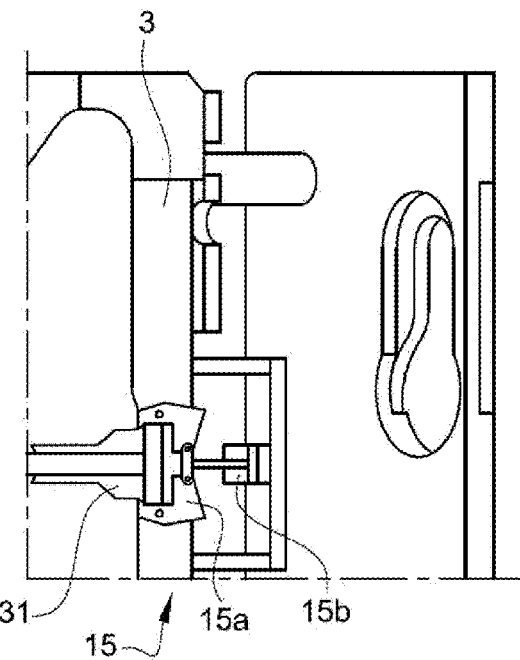
FIG. 14 is a cross-sectional view of a mold part according to the invention showing a gripping element in the activated state.

In the examples shown in FIGS. 13 to 16, the at least one first mold 1 section 3 comprises an element selected from a gripping element 15, a heating element 16, 16' and a combined gripping element 15 and heating element 16, 16' for gripping and/or heating a workpiece 31, which may or may not be said at least one internal component 30, intended to be molded with the first portion of the hollow body 10, the gripping element can thus be a clamp 15a or a suction element. In the examples of FIGS. 13-14, the clamp 15a can go from an open position (FIG. 13) to a closed position (FIG.

Figure 15:
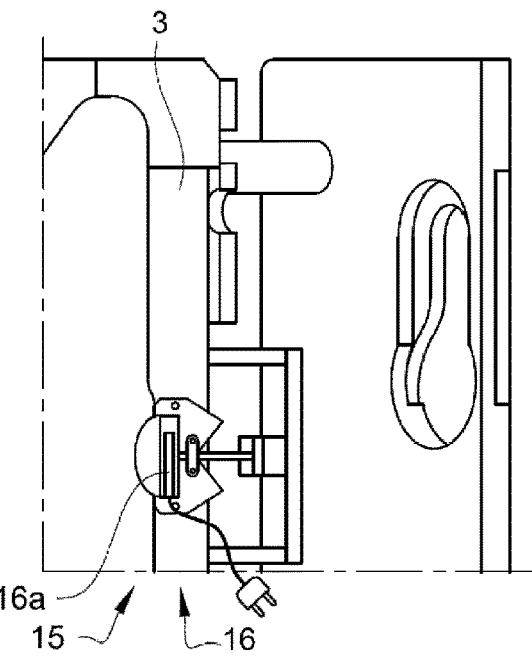
FIG. 15 is a cross-sectional view of a mold part according to the invention showing a combined gripping and electrical heating element in the non-activated state.
Figure 16:
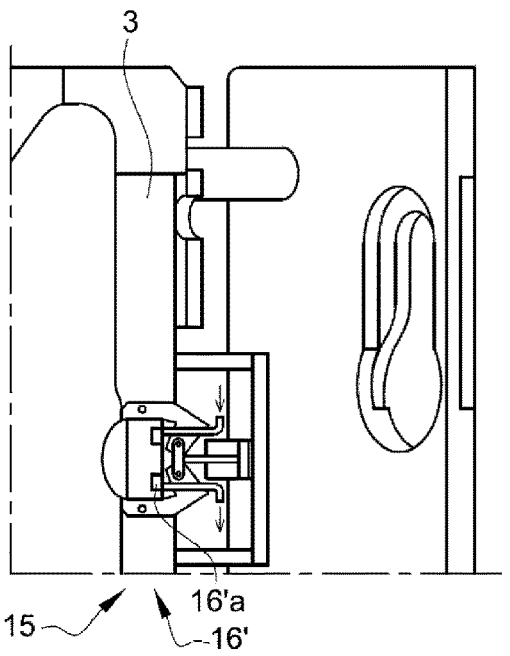
FIG. 16 is a cross-sectional view of a mold part according to the invention showing a combined gripping and hydraulic heating element in the non-activated state.

14) using an actuator 15b in order to fold the parison 20 against the workpiece 31 such as, for example, explained in document EP 3,946,905. The heating element 16 in the example of FIG. 15 is an electric heater 16a whereas the one 16' in the example of FIG. 16 is a hydraulic heater 16' a in order to locally heat at least the parison 20. In one example, the workpiece 31 is a metal fastener or fibrous reinforcement.

Figure 12:
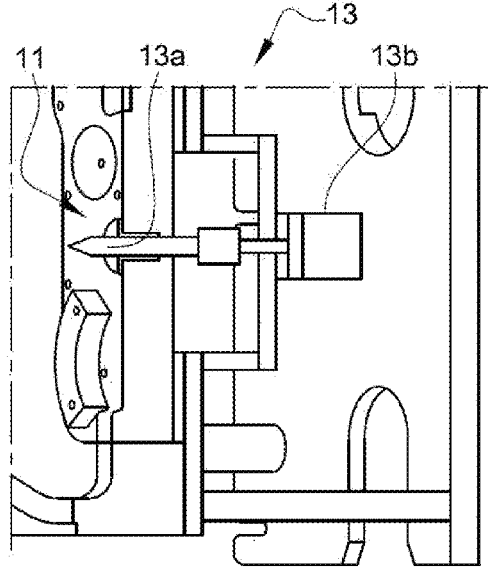
FIG. 12 is a cross-sectional view of a mold part according to the invention showing a blowing tool.

In the example shown in FIG. 12, the at least one first mold section 3 of mold 1 comprises a blowing tool 13 intended to introduce a pressurized gas inside the parison 20. As can be seen in FIG. 12, the blowing tool 13 comprises a blowing needle 13a capable of piercing the parison 20 in order to execute step d). It can also be seen that the needle 13a is mounted movable relative to the first molding surface 11 by means of an actuator 13b to go from a position retracted into the at least one first section 3 to a position protruding from the bottom of the first molding surface 11 and vice versa.

Figure 17:
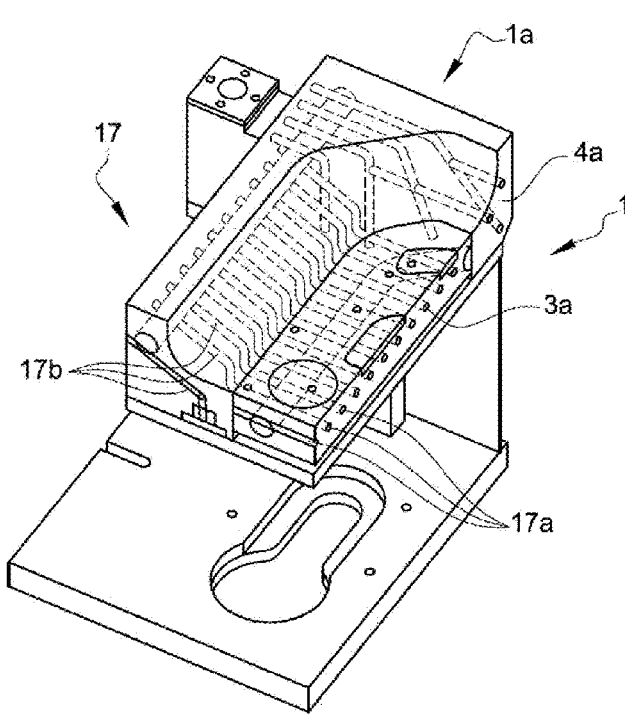
FIG. 17 is a cross-sectional view of a mold part according to the invention showing a cooling device.

In the example shown in FIG. 17, the at least one first section 3 and/or the second section 4 of the part 1a of the mold 1 comprises a cooling device 17 intended to cool a portion of the hollow body 10. The at least one first section 3a of mold 1 comprises cooling elements 17a intended to cool the first portion of the hollow body 10. The second mold 1 section 4a comprises cooling elements 17b intended to cool the second portion of the hollow body 10. Of course, the cooling elements 17a, 17b can be part of the same hydraulic circuit of the cooling device 17.

Figure 8:
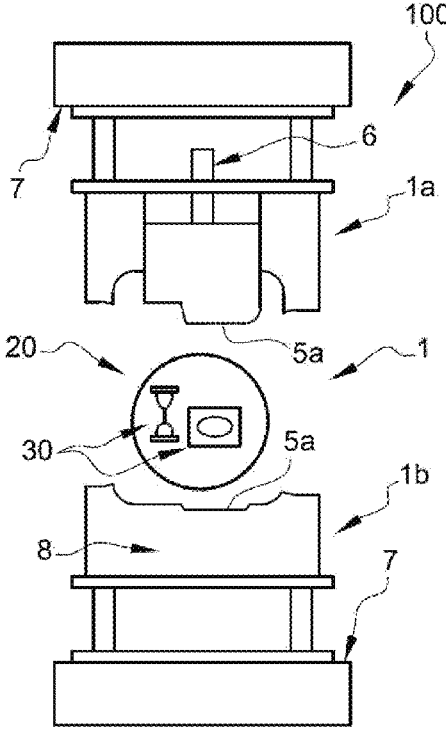
FIGS. 8 to 10 are schematic sectional views of a second embodiment of a mold according to the invention in different successive positions.

FIGS. 8 to 10 show a second embodiment of the mold 1. The second embodiment differs from the first embodiment in that the second mold part 1b of mold 1 forms a single-piece section 8. In other words, the single-piece section 8 in FIGS. 8 to 10 replaces the at least one first section 3b and the second section 4b of the part 1b of the mold 1 relative to the first embodiment of FIGS. 5 to 7. This simplifies the mold 1 by reducing the number of parts necessary for its construction.

FIGS. 18 to 21 show a third embodiment of the mold 1. The third embodiment differs from the first embodiment in that the mold 1 is a mold using extrusion blow-molding to manufacture a hollow body 10 for a "saddle tank" made of plastic material for a motor vehicle from a parison 20.

The part 1a of the mold 1 comprises at least one third section 18, 18a having a third surface 19, 19a for molding a third portion of the hollow body 10 to be manufactured. The third molding surface 19, 19a has at least one secondary contact region 5b. The at least one third section 18, 18a of the part 1a of the mold 1 is movable relative to the associated at least one first section 3, 3a of the part 1a of the mold 1 at least between an intermediate position and a final position. In the final position, the at least one secondary contact region 5b is configured to reduce, by pressing, a predetermined volume within the parison 20.

In the examples shown in FIGS. 18 to 25, the third molding surface 19, 19a of the part 1a of the mold 1 comprises several secondary contact regions 5b. In these examples, the first part 1a of the mold 1 comprises at least one first section 3a, a second section 4a and at least one third section 18a, while the second part 1b of the mold 1 comprises a second section 4b and a single one-piece section combining the at least one first section 3b and the at least one third section 18b.

Figure 18:
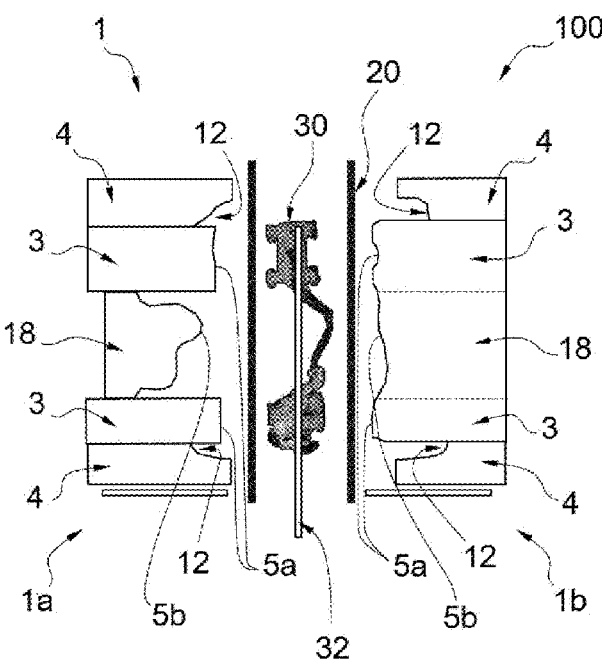
FIGS. 18 to 21 are schematic sectional views of a third embodiment of a mold according to the invention in different successive positions.
Figure 19:
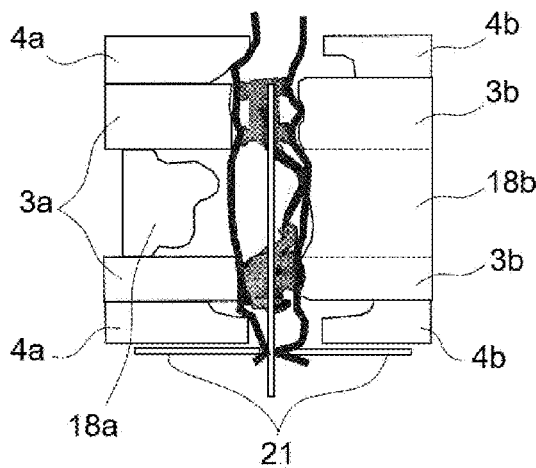
Figure 20:
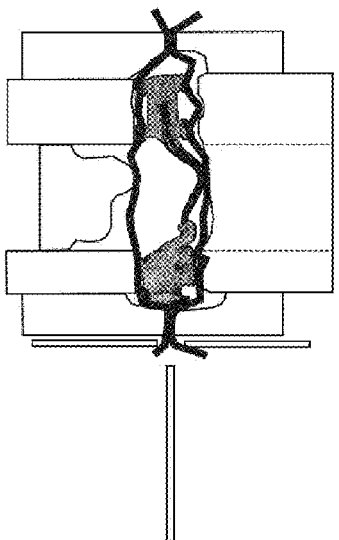
Figure 21:
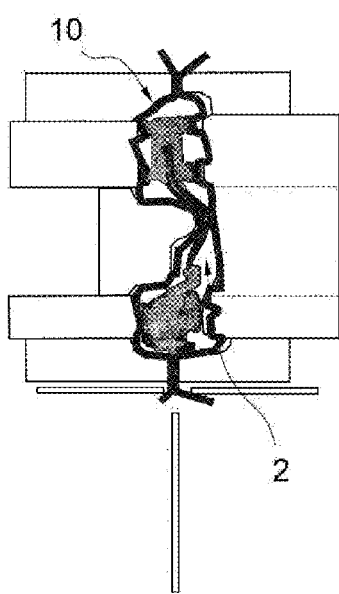
Figure 22:
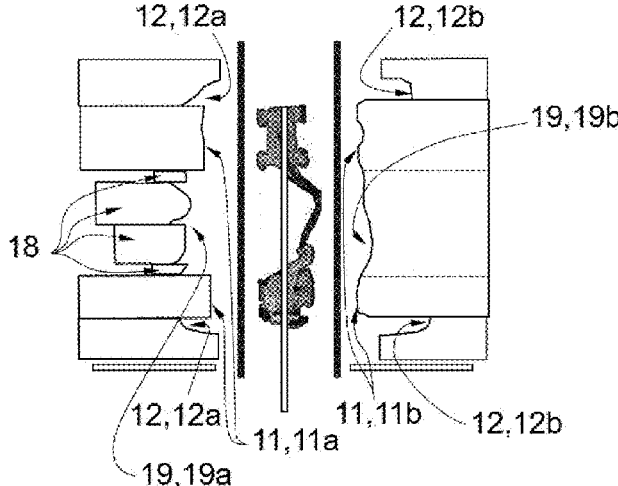
FIGS. 22 to 25 are schematic sectional views of a fourth embodiment of a mold according to the invention in different successive positions.
Figure 23:
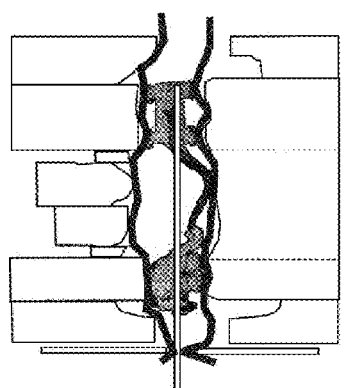
Figure 24:
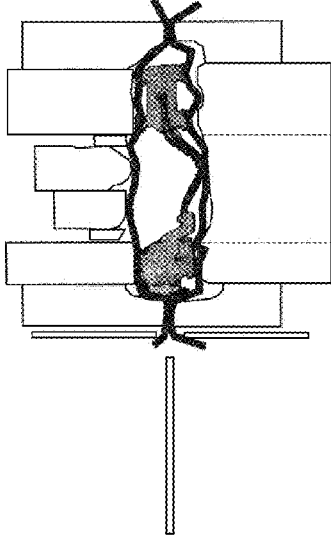
Figure 25:
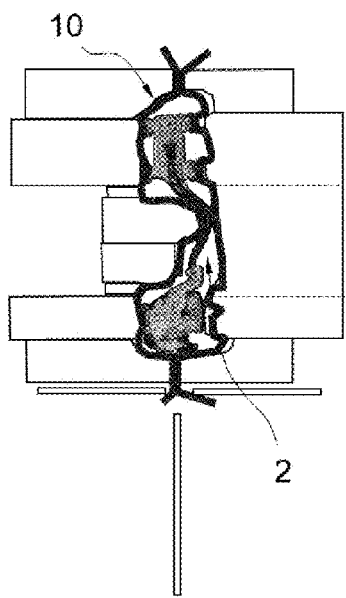

FIGS. 18 to 21 also show part of a molding machine 100 for molding by blow-molding a hollow saddle tank body 10 made of plastic material for a motor vehicle from a parison 20. The machine 100 comprises the mold 1 presented above according to a third embodiment. FIG. 18 shows the mold 1 in the open position (open mold 1), FIG. 19 shows the mold 1 in the intermediate closed position and FIG. 20 shows the mold 1 in the final closed position. FIG. 20 also shows the at least one third section 18 of the part 1*a* of the mold 1 in the intermediate position, and FIG. 21 shows the at least one third section 18 of the part 1*a* of the mold 1 in the final position.

In the example shown above, in the final closed position of the parts 1*a*, 1*b* of the mold 1, the second section 4, 4*a*, 4*b* of the mold 1 surrounds the at least one first section 3, 3*a*, 3*b* of the mold 1 and the at least one first section 3, 3*a*, 3*b* of the mold 1 surrounds the at least one third section 18, 18*a*, 18*b*, so that the first 11, 11*a*, 11*b*, second 12, 12*a*, 12*b* and third 19, 19*a*, 19*b* molding surfaces come together to form the total molding surface, or cavity 2.

FIGS. 18 to 21 also show a molding method for molding by extrusion blow-molding a hollow saddle tank body 10 made of a plastic material for a motor vehicle from a parison 20, the saddle tank comprising at least one internal component 30 fixed inside the parison 20 during the molding of the hollow body 10, the method comprises the following steps, preferably carried out successively:

a) introducing said at least one internal component 30 and the molten parison 20 into an open mold 1 in two parts 1*a*, 1*b* so that said at least one internal component 30 is surrounded by the parison 20, at least one part 1*a*, 1*b* of said mold 1 comprising at least one first section 3, a second section 4 and at least one third section 18 internally delimiting a first molding surface 11, a second molding surface 12 and a third molding surface 19, respectively, of a total molding surface of the mold 1, b) moving the at least one first section 3 of the part 1*a*, 1*b* of the mold 1 to bring the mold 1 into an intermediate closing position wherein the at least one first section 3 of the part of the mold 20 presses the parison against said at least one internal component 30 in order to fix said at least one internal component 30 inside the parison 20, the first molding surface 11 being configured to form at the same time, by pressing, multiple regions for fixing said at least one internal component 30 inside the parison 20, c) moving the second section 4 of the part 1*a*, 1*b* of the mold 1 relative to the at least one first section 3 of the part 1*a*, 1*b* of the mold 1 to bring the mold 1 into a final closing position wherein the two parts 1*a*, 1*b* of the mold 1 are closed against each other and internally delimit the total molding surface intended to reproduce a predetermined shape of the hollow body 10 to be manufactured, d) moving the at least one third section 18 of the part 1*a*, 1*b* of the mold 1 relative to the at least one first section 3 of the part 1*a*, 1*b* of the mold 1 to bring the at least one third section 18 into a position wherein the third molding surface 19 presses the parison 20 in order to reduce a predetermined volume within the parison 20, e) performing a blowing of the parison 20 by pressing said parison 20 on the total molding surface of the mold 1 using a pressurized gas, f) opening the mold 1 to take out the manufactured hollow body 10.

Preferably, a pressurized gas is introduced inside the parison 20 to pre-blow said parison 20 between step a) and step b). Such an introduction of gas can be carried out according to step b) of document WO 2008/138869 in order in particular to expand the parison by homogenizing its thickness of the parison. The introduction of gas at lower pressure than for step e) can be obtained in different ways known by the person skilled in the art. As a non-limiting example, the introduction of gas for the pre-blowing can be obtained by the blowing tool used to perform step e), by a dedicated tool mounted on the mold, by a hollow shaft for internal component support or by a nozzle comprised in the parison extrusion head.

Advantageously, in step b), said at least one internal component 30 can be fixed inside the parison 20 by welding, heading or mechanical anchoring.

In the final closed position of the mold 1, the blowing of step e) is carried out under a blowing pressure of the order of 10 bar (1 MPa).

Preferably, the at least one third section 18 of the part 1*a*, 1*b* of the mold 1 is divided into multiple subsections which are movable relative to one another between an intermediate position and a final position, and the third molding surface 19 comprises multiple secondary contact regions 5*b*, each secondary contact region 5*b* being carried by a subsection of the at least one third section 18.

FIGS. 22 to 25 show a fourth embodiment of the mold 1. The fourth embodiment differs from the third embodiment in that the at least one third section 18, 18*a* of the part 1*a* of the mold 1 is divided into several subsections separated from each other, and each secondary contact region 5*b* is carried by a subsection of the at least one third section 18, 18*a* of the part 1*a* of the mold 1.

Advantageously according to the invention, the subsections of the at least one third section 18, 18*a* of the part 1*a* of the mold 1 are movable relative to one another between an intermediate position and the final position.

Figure 26:
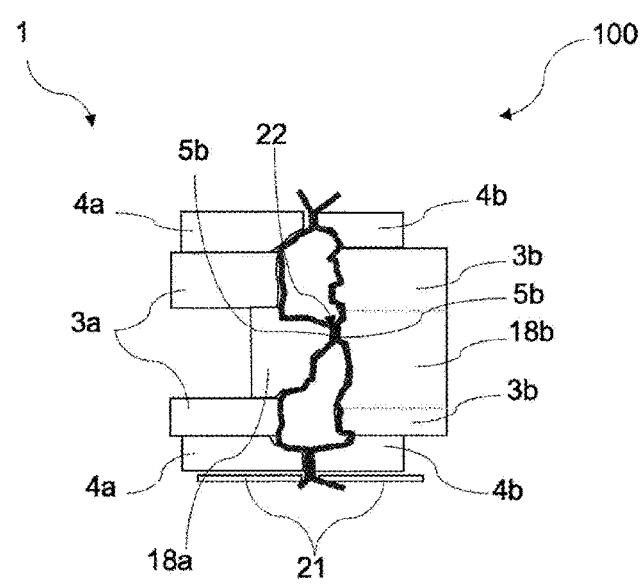
Figure 27:
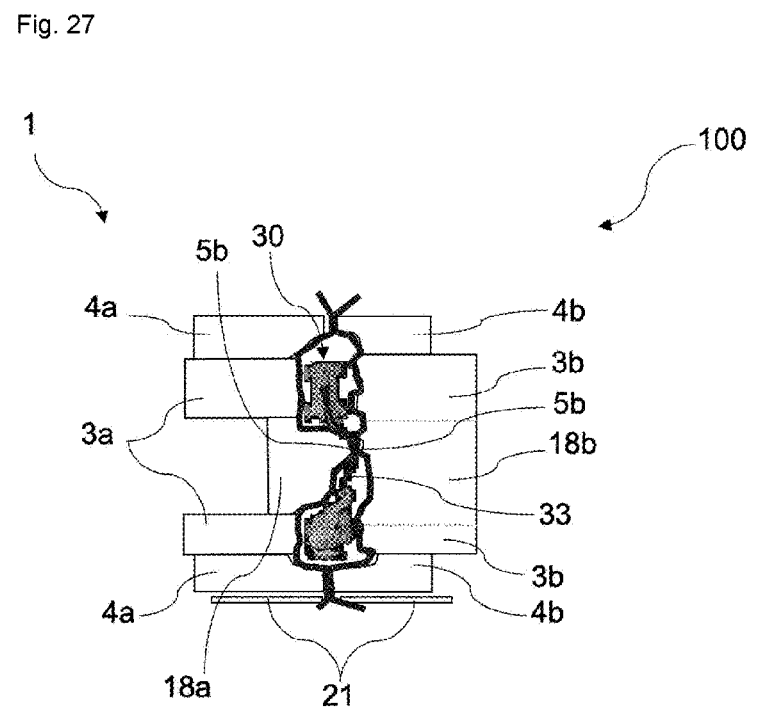

FIGS. 26 and 27, wherein the mold 1 is in its final position, show a fifth embodiment of the mold 1. The fifth embodiment differs from the third embodiment in that the secondary contact region 5*b* is configured so as, when the third section 18, 18*a*, 18*b* of the part 1*a*, 1*b* of the mold 1 is in its final position, to bring two opposing regions of the parison 20 into contact so as to locally weld them together. This local weld 22 is sometimes referred to as a "kiss off" or "kiss point" and, for example, serves to locally reinforce the hollow body. More particularly, according to this particular embodiment, each part 1*a*, 1*b* of the mold 1 comprises at least one secondary contact region 5*b*, the secondary contact regions 5*b* being configured, when the respective third sections 18*a*, 18*b* of each part 1*a*, 1*b* of the mold 1 are in their final position, to press between them two opposing regions of the parison 20 so as to locally weld them together. This makes it easy to create a local weld 22, for example, to reinforce the hollow body. It is understood that the secondary contact regions 5*b* have a particular shape enabling the two opposite regions of the parison 20 to be brought into contact in order to allow local welding 22. This shape varies according to the embodiment, for example depending on the desired contact surface between the two opposing regions of the parison 20.

FIGS. 26 and 27 show the mold 1 in its final position along a sectional plane passing through the local weld 22. In the present case, it can be seen that this local weld 22 locally connects the walls of the parison 20 intended to form the upper and lower walls of the hollow body 10.

FIG. 27 also shows the internal component 30 to be fixed. In this example, the internal component 30 comprises a fuel line 33 connecting two opposite parts of the internal component 30. Note that the fuel line 33 is not located in the sectional plane passing through the local weld 22, but in another plane parallel to it.

The invention is not limited to the embodiments and variants presented, and other embodiments and variants will become clearly apparent to the person skilled in the art. Thus, the above embodiments are examples. Although the description refers to one or more embodiments, this does not necessarily mean that each reference relates to the same embodiment, or that the features apply only to a single embodiment. Simple features of different embodiments can also be combined and/or interchanged to provide other embodiments. In a non-limiting manner, in the second embodiment, only one actuator 7 is used to move the second section 4a toward the single-piece section 8 (which would therefore be static) in order to further simplify the molding machine 100. Likewise, although FIGS. 1 to 17 show the presence of a single first section 3a, 3b of the part 1a, 1b of the mold 1, it can be envisaged that the at least one first section 3a, 3b of the mold 1 comprises multiple first sections 3a, 3b, for example two, three, four, five, six, seven, eight, nine or ten first sections 3a, 3b.

LIST OF REFERENCES

1: mold
1a: first part of the mold
1b: second part of the mold
2: mold cavity
3, 3a, 3b: first mold section
4, 4a, 4b: second mold section
5a: primary contact region
5b: secondary contact region
6: first actuator
7: second actuator
8: one-piece section
9: support plate
10: hollow body
11, 11a, 11b: first molding surface
12, 12a, 12b: second molding surface
13: blowing tool
13a: blowing needle
13b: blowing needle actuator
14: suction element
14a: bottom suction element
14b: primary contact region suction element 5a
14c: connection to suction device
15: gripping element
15a: clamp
15b: actuator
16, 16': heating element
16a: electric heater
16b: hydraulic heater
17: cooling device
17a: cooling element of the first section 3a
17b: cooling element of the second section 4a
18, 18a, 18b: third mold section
19, 19a, 19b: third molding surface
20: parison
21: moving parts of a lower parison sealing device
22: local weld
30: internal component
31: part
32: internal component support rod
33: fuel line
100: extrusion blow-molding machine
The invention claimed is:

1. A mold for manufacturing by extrusion blow-molding a hollow tank body made of plastic material for a motor vehicle from a parison, the tank comprising at least one internal component fixed to an interior of the parison during the molding of the hollow body, the mold comprising two parts movable relative to one another delimiting internally, when they are closed against each other, a total molding surface intended to reproduce a predetermined shape of the hollow body to be manufactured, at least one of the parts of the mold comprises:

at least one first section having a first molding surface of a first portion of the hollow body to be manufactured, said first molding surface comprises at least one primary contact region configured to form, by pressing, a fixing region for fixing said at least one internal component inside the parison, a second section having a second surface for molding a second portion of the hollow body to be manufactured, said second section of the part of the mold is movable relative to the associated at least one first section of the part of the mold at least between an intermediate closed position and a final closed position of the parts of the mold, and at least one third section having a third molding surface of a third portion of the hollow body to be manufactured, said third molding surface comprises at least one secondary contact region, said at least one third section of the part of the mold is movable relative to the associated at least one first section of the part of the mold at least between an intermediate position and a final position wherein the at least one secondary contact region is configured to reduce, by pressing, a predetermined volume within the parison.

2. The mold according to claim 1, wherein the first molding surface of the part of the mold is configured to extend along a circumscribed surface containing the primary contact regions associated with the part of the mold.

3. The mold according to claim 2, wherein the circumscribed surface of the first molding surface of the part of the mold comprises a predetermined margin distance at least around the primary contact regions of said at least one internal component associated with the part of the mold in order to limit ripples of material around each fixing region.

4. The mold according to claim 3, wherein the predetermined margin distance at least around the fixing regions is between 1 mm and 60 mm.

5. The mold according to claim 2, wherein the circumscribed surface of the first molding surface of at least one of the parts of the mold is at least equal to 15% of the total molding surface.

6. The mold according to claim 1, wherein the secondary contact region or at least one of the secondary contact regions is configured so as, when the third section of the part of the mold is in its final position, to bring two opposing regions of the parison into contact so as to locally weld them together.

7. The mold according to claim 1, wherein the third molding surface of the part of the mold comprises several secondary contact regions.

8. The mold according to claim 7, wherein the at least one third section of the part of the mold is divided into several subsections separated from each other, and each secondary contact region is carried by a subsection of the at least one third section of the part of the mold.

9. The mold according to claim 8, wherein the subsections of the at least one third section of the part of the mold are movable relative to one another between an intermediate position and the final position.

10. The mold according to claim 1, wherein each part of the mold comprises at least one first section, a second section, and at least one third section.

11. The mold according to claim 10, wherein the at least one first mold section of each part of the mold comprises at least one primary contact region configured to press the parison against said same at least one internal component in order to form at least two different fixing regions of said same at least one internal component for fixing said same at least one internal component inside the parison during the molding of the hollow body.

12. The mold according to claim 1, wherein only one of the parts of the mold comprises at least one first section, a second section, and at least one third section.

13. The mold according to claim 1, wherein, in the final closing position, the at least one first mold section of each part of the mold is surrounded by its associated second section of the part of the mold.

14. The mold according to claim 1, wherein, in the final closed position, the at least one third mold section of each part of the mold is surrounded by its associated at least one first section of the part of the mold.

15. The mold according to claim 1, wherein the at least one first and/or third section of the part of the mold comprises multiple first and/or third sections.

16. A molding machine for molding by extrusion blow-molding a hollow tank body made of plastic material for a motor vehicle from a parison, the machine comprising the mold according to claim 1.

17. A molding method for molding by extrusion blow-molding a hollow tank body made of plastic for a motor vehicle from a parison, the tank comprising at least one internal component fixed inside the parison during the molding of the hollow body, the method comprising the following steps:

a) introducing said at least one internal component and the parison in a molten state into an open mold in two parts so that said at least one internal component is surrounded by the parison, at least one part of the mold comprising at least one first section, a second section and at least one third section internally delimiting a first molding surface, a second molding surface, and a third molding surface, respectively, of a total molding surface of the mold, b) moving the at least one first section of the part of the mold to bring the mold into an intermediate closed position wherein the at least one first section of the part of the mold presses the parison against said at least one internal component in order to fix said at least one internal component inside the parison, the first molding surface being configured to form, by pressing, multiple fixing regions for fixing said at least one internal component inside the parison, c) moving the second section of the part of the mold relative to the at least one first section of the part of the mold to bring the mold into a final closing position wherein the two parts of the mold are closed against each other and internally delimit the total molding surface intended to reproduce a predetermined shape of the hollow body to be manufactured, d) moving the at least one third section of the part of the mold relative to the at least one first section of the part of the mold to bring the at least one third section into a position wherein the third molding surface presses the parison in order to reduce a predetermined volume within the parison, e) performing a blowing of the parison by pressing said parison on the total molding surface of the mold using a pressurized gas, f) opening the mold to take out the manufactured hollow body.

18. The molding method according to claim 17, wherein a pressurized gas is introduced inside the parison to pre-blow said parison between step a) and step b).

\* \* \* \* \*